United States Patent [19]
Walker

[11] 3,955,599
[45] May 11, 1976

[54] APPARATUS FOR BENDING A FLOWLINE UNDER SUBSEA CONDITIONS

[75] Inventor: Raymond W. Walker, Huntington Beach, Calif.

[73] Assignee: Deep Oil Technology, Inc., Long Beach, Calif.

[22] Filed: Jan. 2, 1975

[21] Appl. No.: 537,838

Related U.S. Application Data

[62] Division of Ser. No. 402,058, Oct. 1, 1973, Pat. No. 3,893,305.

[52] U.S. Cl.................................. 138/103; 72/295; 72/369
[51] Int. Cl.² .......................................... F16L 55/00
[58] Field of Search ...... 138/103, 177, 178, DIG. 8; 72/369, 394, 367, 380, 318, 210; 61/72.3, 72.1, 72.4; 214/1 PA, 1 PB; 198/109

[56] References Cited
UNITED STATES PATENTS

| | | | |
|---|---|---|---|
| 2,177,128 | 10/1939 | Johnson | 138/110 |
| 2,286,893 | 6/1942 | Boissou | 72/369 X |
| 3,731,513 | 5/1973 | Kinderman et al. | 72/295 |

Primary Examiner—Richard E. Aegerter
Assistant Examiner—Larry Jones
Attorney, Agent, or Firm—Poms, Smith, Lande & Glenny

[57] ABSTRACT

An apparatus for terminating a subsea flowline at an offshore structure by providing a bend in the continuous flowline at the bottom of the offshore structure to provide an upstanding flowline end portion adapted to be secured to the offshore structure. A pipe bending device comprising a plurality of spaced cylindrical segments sleeved over a selected location on the flowline with adjacent segments pivotally interconnected to each other on one side of the flowline and end cylindrical segments pivotally interconnected to each other by a cylinder and piston means on the opposite side of the flowline. The device is fixed to the flowline at an end segment thereof. Actuation of the cylinder and piston means imposes a bending force on the flowline within the cylindrical segments for imparting a bend of selected radius to the flowline within the cylindrical segments. In the method of subsea bending of the flowline, such initial bending forces by the bending device assure bending of the flowline, which is normally under tension during laying, at a desired location as the vessel laying the flowline reduces tension therein to bring the upward rising flowline pipe portion into position for connection to the offshore structure.

11 Claims, 9 Drawing Figures

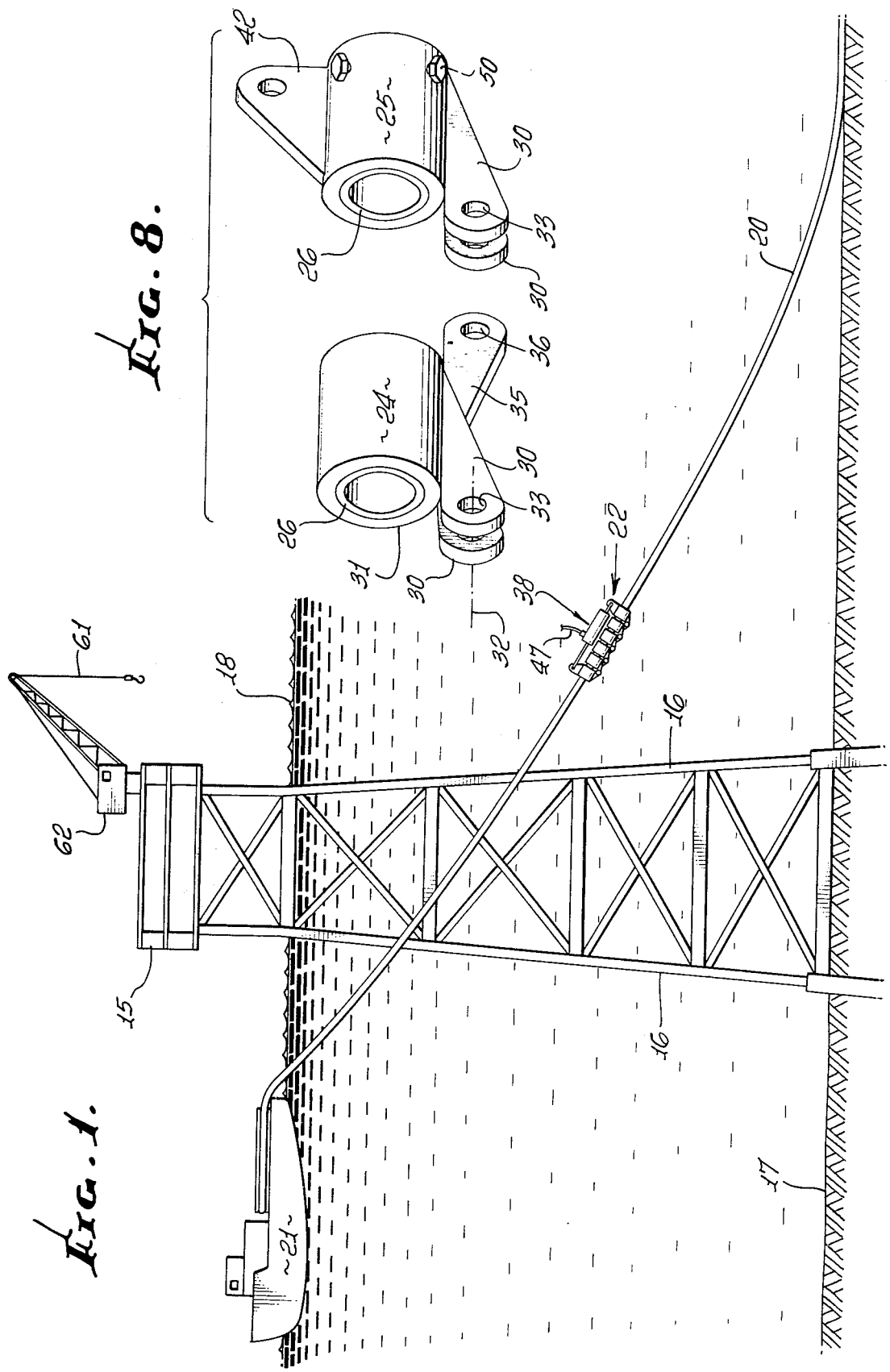

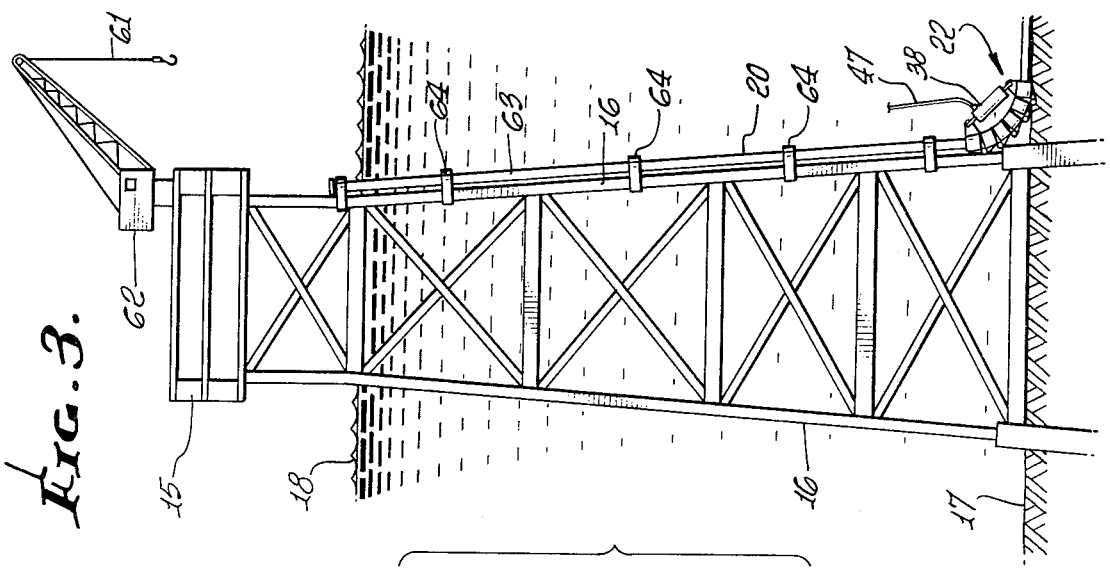
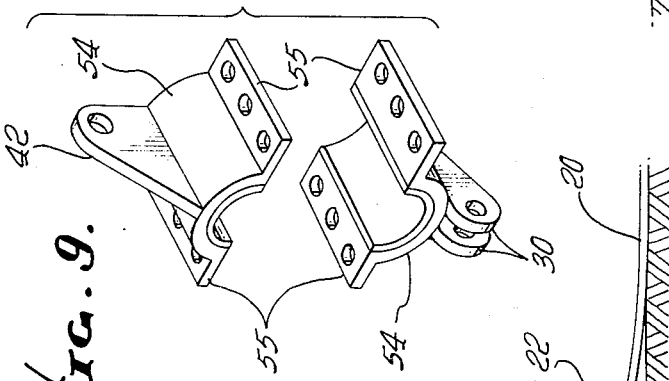
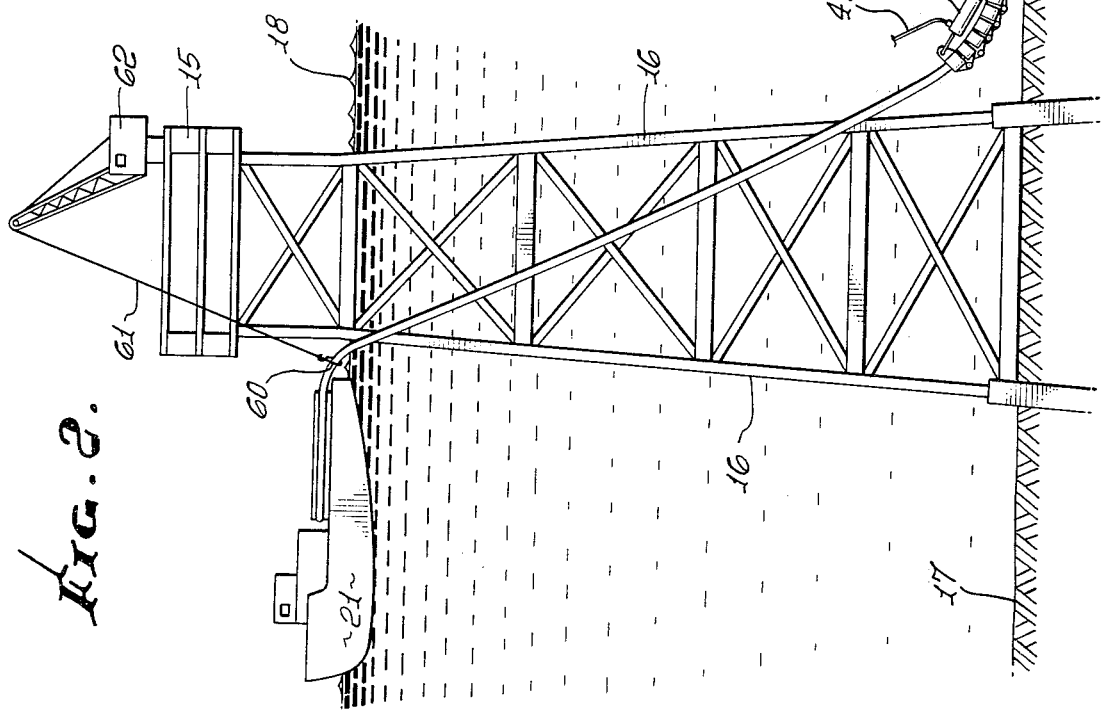

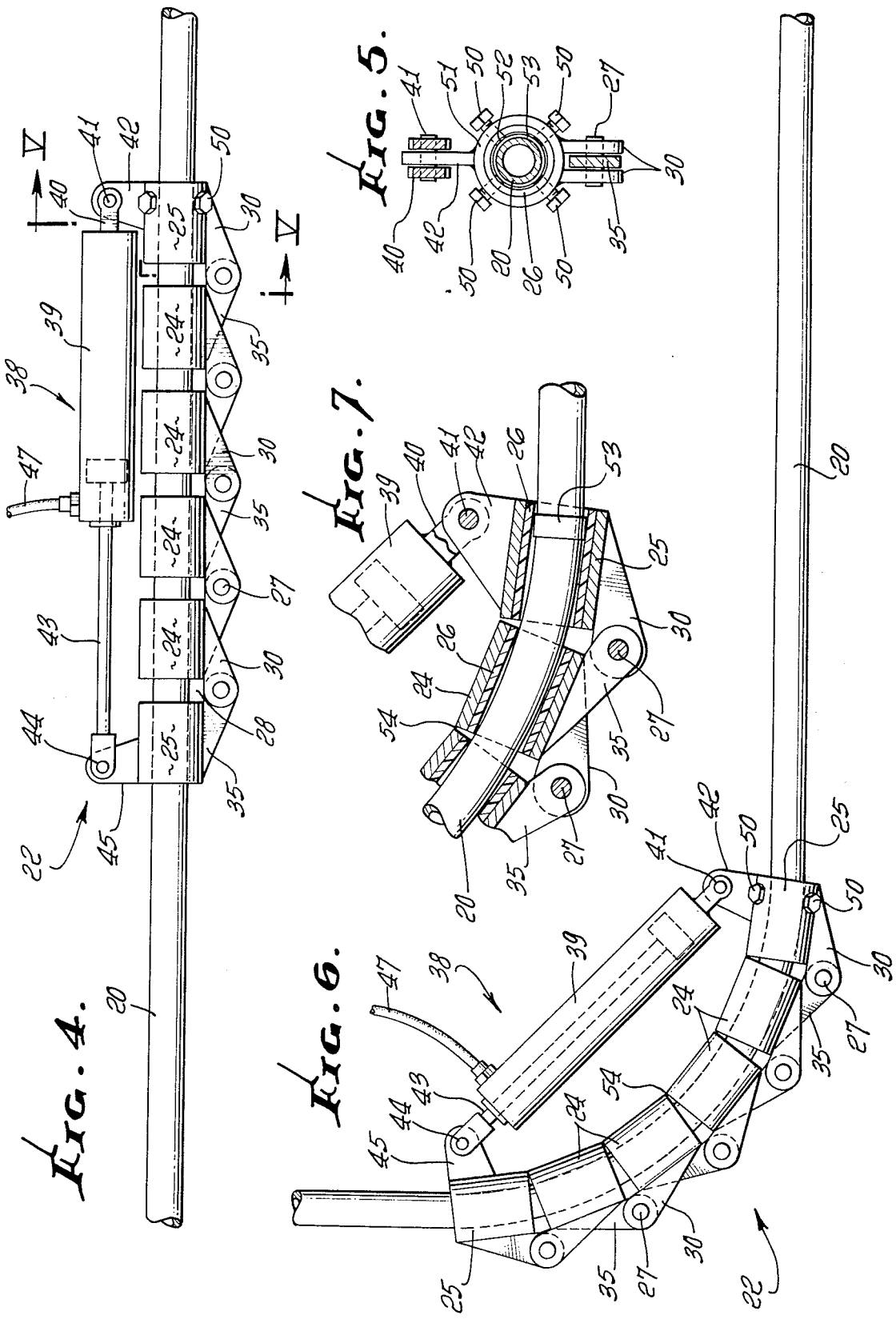

APPARATUS FOR BENDING A FLOWLINE UNDER SUBSEA CONDITIONS

This application is a Divisional application of Ser. No. 402,058 filed Oct. 1, 1973 now U.S. Pat. No. 3,893,305 entitled Method and Apparatus For Terminating Continuous Flowline By Bending.

BACKGROUND OF INVENTION

Pipe or flowlines are laid along a sea floor to transport fluid such as oil or gas. At offshore structures the flowline includes an upstanding vertical portion attached to the structure and having an end available above the sea surface for connection to a storage tank, a tanker vessel, or other facilities for storage and distribution of the fluid. Generally speaking, prior proposed riser flowline portions at offshore structures have included a separate pipe portion having a lower end connected to a flowline at the sea bottom by usual pipe interconnecting and coupling devices assembled and installed by divers. In other prior proposed vertical flowline risers "J" tubes were installed during construction of the offshore platform and a flowline was pulled into position by means of a wire line passed through the "J" tube receiver. Such prior proposed arrangements were expensive and time consuming in installation. Since an offshore structure may be a terminal for a plurality of flowlines, the number of flowlines must be accurately predicted when a "J" tube receiver was installed at the time of construction of the offshore structure. Moreover, installations of such prior proposed constructions became proportionately more expensive as the installations were made in deeper and deeper water.

Various devices have been proposed for bending a flowline to provide a selected radius of curvature. In U.S. Pat. No. 3,650,114 a plurality of sleeves are associated with the flowline, each sleeve being connected to a hydraulic cylinder and piston. The cluster of hydraulic cylinders and pistons were used to gradually swing the flowline outwardly from the platform and downwardly so that the flowline would be subjected to bending depending upon the extension of each individual piston and cylinder means. In U.S. Pat. No. 3,531,941 a bending device was mounted on a pipe a selected distance from its end. A cable connected to the bending device was passed through a pulley at the bottom of a derrick leg near the sea floor and then to a winch on the platform so that the bending member and flowline could be drawn toward the bottom of the leg and at the same time subjected to bending, the upper end of the flowline being secured to the platform. In U.S. Pat. No. 3,640,080 a bending device is moved down a rail secured to the platform for bending the flowline, the free end of the flowline being held by the pipe laying vessel. Such prior proposed bending devices were relatively complicated and complex, were expensive to manufacture, and were difficult to operate in order to achieve a precise bending at a precise location.

SUMMARY OF INVENTION

The present invention relates to an apparatus for bending a subsea flowline and a pipe or flowline bending device which is of simple construction and which facilitates the termination of a flowline at an offshore platform by utilizing a straightforward system for accomplishing bending of the flowline at a precise location.

The advantages of the present invention will be more readily understood in the light of conditions prevalent during laying of a flowline. A flowline is laid from a moving vessel which carries a supply of flowline arranged on the vessel in one or more ways to facilitate movement of the flowline from the vessel into the sea to the sea bottom. The portion of the flowline between the vessel and the sea floor is relatively heavy and subjected to gravitational forces. In addition, this flowline portion between the sea surface and the sea floor is subjected to tension forces because of the stationary portion of the flowline at the sea floor and the continuous movement of the vessel relative to the sea floor as the flowline is being laid. The present invention utilizes such flowline laying condition to best advantage.

Generally speaking, the method of this invention contemplates trailing a flowline from a moving vessel to lay the flowline on the sea floor alongside and past an offshore structure to which the flowline is to be attached. A flowline bending unit is attached to the flowline at a selected point along its length, the point to be located at the bottom of the offshore structure and where the upturning of the flowline is desired. The pipe bending unit comprises a plurality of longitudinally spaced cylindrical segments sleeved over the flowline and having end segments fixedly attached to the flowline. The plurality of segments are pivotally interconnected along one side by pivotal connections disposed opposite the joint space between cylindrical segments and pivotally connected on the other side by a cylinder and piston means. The cylinder and piston means may be actuated at a suitable time during laying of the flowline to impart an initial bending force to the cylinder segments but not sufficient to exceed the tension forces in the flowline before tension reduction is desired for starting the bending operation. During laying of the flowline, the pipe laying vessel passes alongside the offshore structure and when the selected length of flowline is provided, slowing down of the vessel causes reduction of tension in the flowline and sagging thereof. Because of the prebending force applied to the flowline at the bending unit, the flowline commences to bend at the unit. When the bent portion of the flowline is located at the sea floor, additional bending forces may be imparted to the pipe bending unit so that the cylinder and piston draw the end segments toward each other and impart a bend of desired radius to the flowline portion at the bottom of the offshore structure. Actuation of the cylinder and piston means is remotely controlled from the vessel.

It is therefore the main object of the present invention to provide a novel apparatus for terminating a flowline at an offshore structure and a novel pipe line bending unit readily adaptable to be applied to a flowline and remotely actuated.

An object of the present invention is to provide a novel apparatus and pipe bending unit for use with flowline subsea installations wherein assistance of divers or robots are not required.

Another object of the present invention is to provide a pipe bending unit which may be readily installed and fixed to a flowline and which may be retained on the flowline after the flowline is bent for purposes of protection of the flowline.

Another object of the invention is to provide a pipe bending unit wherein damage or marring of a protective coating on the flowline is eliminated or minimized.

A further object of the present invention is to provide a remotely actuatable pipe line bending unit of novel construction in which a plurality of spaced coaxially aligned cylindrical segments are interconnected by pivotal means provided opposite the joint spaces between the cylindrical segments and on the other side are pivotally connected by a fluid operable actuating means for drawing end segments toward each other.

Various other objects and advantages of the present invention will be readily apparent from the following description and drawings in which embodiments of the invention are shown.

IN THE DRAWINGS

FIG. 1 is a schematic side elevational view of an offshore platform and a vessel laying a flowline for connection to the offshore platform, the flowline carrying a pipe bending unit of this invention.

FIG. 2 is a view similar to FIG. 1 showing the upstanding riser portion of the pipe being bent into proper relationship with the legs of the offshore platform.

FIG. 3 is a view similar to FIG. 2 showing the flowline installed on the offshore platform leg.

FIG. 4 is a fragmentary enlarged view of a pipe bending device embodying this invention assembled on a flowline.

FIG. 5 is a transverse sectional view taken in the planes indicated by line V—V of FIG. 4.

FIG. 6 is a fragmentary side elevational view of the pipe bending unit and flowline at the flowline bend.

FIG. 7 is a fragmentary enlarged view partly in section of the unit shown in FIG. 6.

FIG. 8 is an exploded perspective view of an end cylindrical segment and an adjacent segment showing the bracket means for pivotally interconnecting the segments.

FIG. 9 is an exploded perspective view of a modification of the cylindrical segment made in two semi-cylindrical portions.

In FIG. 1 there is shown an offshore platform 15 having braced structural legs 16 fixed to the sea floor 17 in suitable manner. Platform 15 extends above the surface 18 of the sea and may be provided with various types of well and pipe equipment depending upon the operations to be performed at the platform. FIG. 1 also shows a flowline 20 being laid on the sea floor 17 by a moving vessel 21 suitably equiped for such a flowline laying operation. The flowline laying equipment on vessel 21 is only generally indicated and may comprise suitable well known pipe laying equipment. In FIG. 1 the vessel has drawn past offshore platform 15 and a pipe bending means generally indicated at 22 is attached to flowline 20 at a selected location which will correspond to the location of the flowline at the bottom of the adjacent derrick leg 16 as indicated in FIGS. 2 and 3.

Pipe bending means 22 is best shown in FIGS. 4 – 8 inclusive. Pipe bending means 22 comprises a plurality of longitudinally spaced intermediate segments 24 and end segments 25. Cylindrical segments 24 and 25 are provided with the same outer and inner diameters and may be of the same length. Each segment 24 and 25 is provided with an internal sleeve liner 26 of suitable antifriction material to facilitate relative movement of the segments and flowline 20. The internal diameter of sleeve liner 26 is sufficiently greater than the outer diameter of the flowline 20 that said segments may be readily moved along flowline 20 without binding or interference with joints made in flowline 20. The number and length of segments 24 and 25 depends upon the diameter of flowline 20 and the radius of curvature to be imparted to flowline 20 during bending.

Means for pivotally interconnecting the segments 24 and 25 includes a series of first pivotal interconnections 27 located on an external longitudinal axis parallel to the axis of flowline 20 and spaced therefrom a preselected distance depending upon the diameter of flowline 20 and the length of segments 24, 25. Each first pivotal interconnection 27 is located opposite the joint space 28 of adjacent segments. As best shown in FIG. 8 each segment 24 includes a pair of spaced generally triangular brackets 30 extending longitudinally of the axis of segment 24 and projecting beyond one end face 31 of segment 24 to provide a pivotal interconnecting axis 32 defined by aligned ports 33 in the brackets 30. Extending in a longitudinal direction opposite to that of brackets 30 is a single bracket 35 of a triangular shape similar to that of bracket 30 and having an extension provided with a port 36 for alignment with ports 33 when bracket 35 is interleaved between spaced brackets 30 of the adjacent segment. One end segment 25 is provided with a pair of spaced brackets 30 and the other end segment 25 is provided with a single bracket 35 to provide the first pivotal connections to the adjacent intermediate segments 24. Thus on one side of flowline 20 segments 24 and 25 are pivotally interconnected along an external axis at pivot axes disposed opposite joint spaces between adjacent segments.

Means for pivotally interconnecting end segments 25 on the other side of flowline 20, that is in diametrically opposite relation with respect to the axis of flowline is provided by a cylinder and piston means 38. Means 38 includes cylinder 39 having an extension 40 at one end to provide a pivotal connection at 41 to a bracket 42 on end segment 25. Piston rod 43 is provided a pivotal connection 44 with a bracket 45 on the opposite segment 25. End segment brackets 42 and 45 lie in the same plane and in a plane which is diametrical with respect to brackets 35 on the other side of the cylindrical segments. Cylinder 39 may be connected by pressure fluid line 47 to a suitable source of pressure fluid, not shown, on vessel 21. It will be apparent that pressure line 47 extends between the bending means 22 and vessel 21. Thus the string of cylindrical segments are further interconnected by the cylinder and piston means 38 and its connection to the end segments 25.

Means for securing and preventing longitudinal displacement of bending means 22 along the flowline may be provided by reducing the inner diameter of one end segment 25 to afford minimum tolerance between the segment and flowline. Such minimum tolerance would permit sliding of a cylindrical end segment along the flowline to the preselected location for the bending unit. In the event exemplary securement means as shown in FIG. 5 are employed, a plurality of circularly spaced screw bolts 50 are threaded through cylindrical wall 51 of end segment 25 and through liner 26 for pressure contact at 52 with a protective band 53 encircling the flowline.

A preferred exemplary securement means may include an end segment 25 split into flanged semi-cylindrical segments of the type shown and described hereafter in FIG. 9, in which a reduced inner diameter is provided to tightly engage the flowline as the flanged connections are drawn tight.

It will be apparent from the description of the pipe bending unit 22 that in operation, introduction of pressure actuating fluid through line 47 into the cylinder 39 will cause the cylinder and piston means to contract to a position as shown in FIG. 6 and thus draw the segments 24 and 25 into an incremental articulated curvature, the minimum radius of curvature being determined and limited by abutment at 54 of adjacent end faces of adjacent segments. As shown in FIG. 7 the relatively loose fit of the segments with the flowline 20 not only permits such segmented bending, but also serves to provide support for the walls of the flowline to prevent any kinking or unwanted deformation of the walls of the flowline.

In installation of the bending means 22 on a flowline it will be understood that the unit may be slidably sleeved over the flowline when the flowline is made up of straight sections of pipe welded together on the vessel. In those installations where the flowline is placed on a reel and comprises a continuous flowline, each of the segments may comprise semi-cylindrical segment portions 54, FIG. 9 provided with external flanges 55 lying in a plane at 90 degrees to the plane of the brackets 30 and 42. Such flanges may be connected together in well known manner by a plurality of nut and bolt assemblies, not shown, extending through said flanges.

In the method of laying a flowline and providing an upstanding riser portion for terminating the flowline at an offshore platform, it will be understood that vessel 21 is provided with a supply of flowline which is laid along the sea floor in well known manner. The remote end of flowline 20, not shown, may be located at a subsea installation and connected by well known means to a well head, a subsea storage tank, or other subsea facility. Vessel 21 moves along the surface of the sea and the flowline is paid out over the stern of the vessel. Since the depth of the water at the offshore platform is known, the specific point along the flowline which will be located on the sea floor adjacent the bottom of leg 16 can be calculated. When that point on the flowline is reached in laying the flowline, the pipe bending unit 22 may be assembled and attached to the flowline.

It will be understood that the length of flowline between the vessel and the sea bed is subject to tension because of gravational forces and movement of the vessel. To assure that bending of flowline will take place at the pipe bending unit 22, fluid pressure may be applied to the cylinder and piston means 38 to impart an initial bending force to the flowline, such bending force being of a magnitude not to exceed the tension force in the flowline. When the vessel slows down after it has passed the offshore platform, the tension in the flowline will be reduced to a point where the bending forces in the bending unit will exceed the tension forces and thereby initiate bending of the flowline at the bending means 22. During the time when vessel 21 reverses its direction and moves toward the platform 15, flowline tension is reduced. Bending forces are also increased by the bending means. Bending means 22 will come to rest at a position adjacent leg 16 of the platform as illustrated in FIGS. 2 and 3. The bending forces imparted to the pivotally interconnected cylinder segments of the bending means may be selectively increased so that the flowline 20 is bent to desired curvature as shown in FIG. 3.

The upper end of flowline 20 may be secured at 60 to a line 61 of a crane 62. After the flowline 20 is cut from its supply of flowline on the vessel, the crane 62 will move the free end of the flowline into a position along derrick leg 16 for securement of the upstanding riser flowline portion 63 by suitable securement bands or clamps 64 spaced along the derrick leg. The upper end of riser portion 63 may be suitably capped until a connection with other equipment on the platform is made.

It will be apparent from FIG. 3 that the bending unit 22 provides a segmented curved protective cover for the flowline bent portion at the bottom of the derrick leg 16 and that the retention of the pipe bending means on the flowline at this curved section serves to reinforce and further support the flowline. The substantial encasement of the bent flowline portion within the segments 24 and 25 also prevents damage to the flowline as a result of scuffing action of ocean currents against fixed objects.

It will be understood that various changes and modifications may be made in the pipe bending means and the method of terminating a flowline at a subsea installation may be made and may be within the spirit of this invention and all such changes and modifications coming within the scope of the appended claims are embraced thereby.

I claim:

1. A pipe bending means for a subsea flowline having a flowline axis, comprising:
   a plurality of cylindrical segments in spaced apart axial tandem relation adapted to be loosely ensleeved over said flowline and including end cylindrical segments;
   first means pivotally interconnecting adjacent ends of said cylindrical segments along an external line spaced from and laterally paralleling said flowline axis;
   second means pivotally interconnecting said end cylindrical segments along an external line diametrically opposite in respect to said flowline axis to said first external line;
   said second pivotal interconnecting means including a cylinder and piston means;
   and actuating means for the cylinder and piston means to move each segment about its pivotal connection to adjacent segments to bend said flowline about said flowline axis into a preselected arc,
   said spaced cylindrical segments being moved into angularly disposed contacting relation to limit said bend to said preselected arc.

2. A pipe bending means as stated in claim 1 wherein each segment includes an internal liner member of a material to reduce friction between said pipe and cylindrical segment.

3. A pipe bending means as stated in claim 1 wherein said first pivotal interconnecting means includes
   bracket means extending longitudinally beyond ends of each segment to provide a pivot axis between adjacent segment ends.

4. In a pipe bending means as stated in claim 1 wherein said cylindrical segments in spaced relation define joint spaces therebetween;
   and said first pivotal interconnecting means includes bracket means on each segment providing a pivot axis opposite said joint spaces.

5. In a pipe bending means as stated in claim 1 wherein
   each segment may comprise longitudinal semi-cylindrical half sections, and means joining said semi-cylindrical half sections about a flowline.

6. In a pipe bending means as stated in claim 1 including
means on one end segment for securing said one end segment to said flowline.

7. A pipe bending means as stated in claim 1 including releasable means for said second pivotal interconnecting means for removal of said cylinder and piston means;
said cylindrical segments in flowline bent condition serving to reinforce and support said flowline at its curved portion at said sea bottom.

8. A pipe bending means adapted to be carried by a subsea flowline being laid having a flowline axis and operable to impart a bend to the flowline, comprising:
means including a plurality of cylindrical segments in spaced apart tandem relation adapted to be loosely ensleeved over said flowline said means including end cylindrical segments;
first means pivotally interconnecting adjacent ends of said cylindrical segments along an external line spaced from and laterally paralleling said flowline axis;
second means pivotally interconnecting said end cylindrical segments along an external line diametrically opposite in respect to said flowline axis to said first external line;
said second pivotal interconnecting means including a cylinder and piston means;
and actuating means for the cylinder and piston means to move adjacent segments about their pivotal connections into angularly disposed relation to form a segmented predetermined arc by contact of end portions of adjacent segments at the inner radius of the arc to limit bending said flowline about said flowline axis,
said actuating means including a pressure fluid actuating conduit connected to said cylinder and adapted to be connected to a remote control station for actuation when said bending means reaches a predetermined depth in the water in which said subsea flowline is being laid.

9. A pipe bending means for a flowline having a longitudinal axis including:
a plurality of tubular segments having ends axially spaced apart a selected distance and adapted to be ensleeved over said flowline in coaxial relation therewith;
means on said segments providing pivotal connections disposed between adjacent spaced ends of said tubular segments, said pivotal connections lying along a line laterally spaced from said axis and exteriorly of the curvature of a bend to be formed;
and means for imparting bending forces to the flowline and comprising
fluid actuated pressure means,
and means providing axially spaced pivotal connections between said fluid actuated pressure means and certain of said spaced segments,
one of said latter certain segments being held against movement axially of said flowline;
said latter spaced pivotal connections lying along a line laterally spaced from said flowline axis and interiorly of the curvature of the bend to be formed.

10. A pipe bending means as stated in claim 9 wherein said pivotal connections between segments are disposed opposite the space between adjacent segments.

11. A pipe bending means as stated in claim 9 wherein said fluid actuated pressure means includes
a cylinder and piston means and a fluid pressure line connected thereto,
said fluid actuated pressure means having control means remotely located from said plurality of segments.

* * * * *